United States Patent [19]

Stache

[11] Patent Number: 4,879,030

[45] Date of Patent: Nov. 7, 1989

[54] APPARATUS FOR TRANSFORMING SEA WATER, BRACKISH WATER, POLLUTED WATER OR THE LIKE INTO A NUTRIOUS DRINK BY MEANS OF OSMOSIS

[75] Inventor: Knut Stache, Darmstadt, Fed. Rep. of Germany

[73] Assignee: DD-Dynamic Devices Ltd., London, England

[21] Appl. No.: 57,719

[22] Filed: Jun. 1, 1987

Related U.S. Application Data

[63] Continuation of Ser. No. 873,109, Jun. 10, 1986, abandoned, which is a continuation of Ser. No. 617,182, Jun. 4, 1984, abandoned, which is a continuation of Ser. No. 471,636, Mar. 3, 1983, abandoned, which is a continuation-in-part of Ser. No. 298,025, Aug. 31, 1981, abandoned, which is a continuation-in-part of Ser. No. 94,666, Nov. 15, 1979, abandoned.

[30] Foreign Application Priority Data

Nov. 25, 1978 [DE] Fed. Rep. of Germany ......... 285105
Jun. 19, 1979 [DE] Fed. Rep. of Germany ....... 7917456

[51] Int. Cl.⁴ .............................................. B01D 13/00
[52] U.S. Cl. ................................. 210/238; 210/257.2; 210/282; 210/321.6; 426/115; 426/120
[58] Field of Search ................... 55/158; 206/0.5, 204, 206/217, 803, 524.3, 524.5, 524.6; 210/170, 198.1, 198.2, 198.3, 220, 223, 237, 238, 257.1, 257.2, 244, 262, 264, 282, 295, 455, 470, 471, 479, 482, 321.6; 422/48; 426/86, 115, 120, 124

[56] References Cited

U.S. PATENT DOCUMENTS

| | | | |
|---|---|---|---|
| 3,148,141 | 9/1964 | Schonenberger et al. | 210/639 |
| 3,702,820 | 11/1972 | Hough | 210/637 |
| 3,715,035 | 2/1973 | Teeple, Jr. et al. | 210/282 X |
| 4,034,756 | 7/1977 | Higuchi et al. | 128/130 |

FOREIGN PATENT DOCUMENTS 290009 6/1914 Fed. Rep. of Germany ...... 426/120

OTHER PUBLICATIONS

Hackh's Chemical Dictionary, J. Grant Editor, Fourth Edition, Aug. 1973, Allyn and Bacon, Inc., Boston, Mass., p. 282.
Pigman, W. et al., *The Carbohydrates*, Second Edition, 1972, Academic Press, vol. IA, pp. 91–93.

*Primary Examiner*—Ivars Cintins
*Attorney, Agent, or Firm*—Burns, Doane, Swecker & Mathis

[57] ABSTRACT

An elongated flexible housing has an upper part which is water-tight and communicates with a lower part which is formed with a semipermeable membrane for passing through by osmosis pure water components out of sea water. The semipermeable membrane is covered with a fabric having a mesh size between 0.05 and 0.5 mm, to assist in the retention of salt. The waterproof housing part is foldable over the other part, including the membrane, and is filled with a highly concentrated solution of fructose or with glycine. The folded parts are enclosed in a snugly fitting protective envelope of a waterproof material. In a modification, the two housing parts are disconnectably attached to each other by means of a screw nipple.

10 Claims, 3 Drawing Sheets

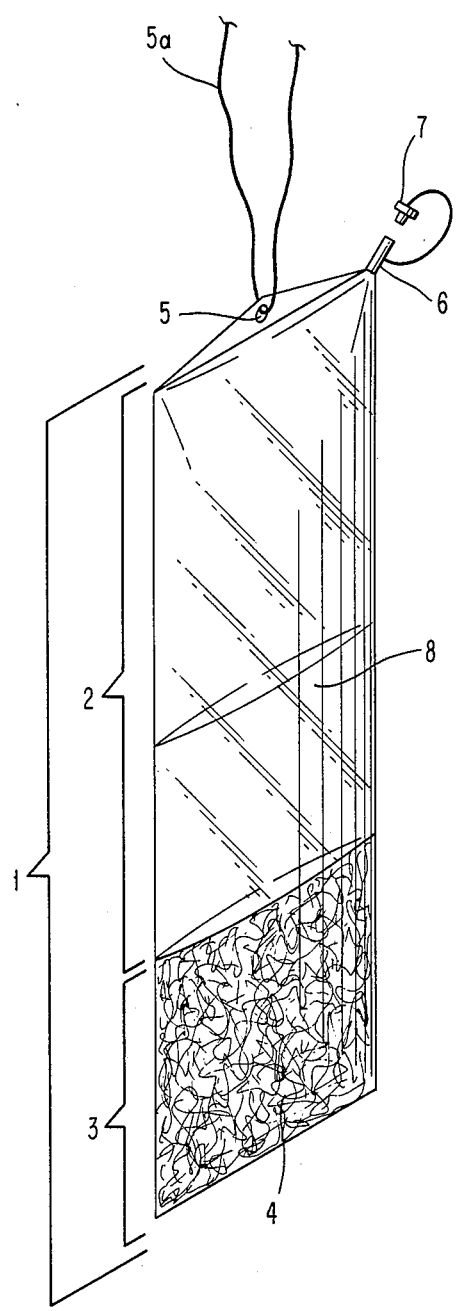
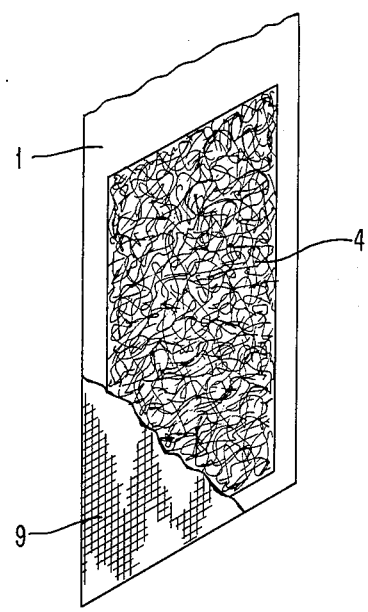
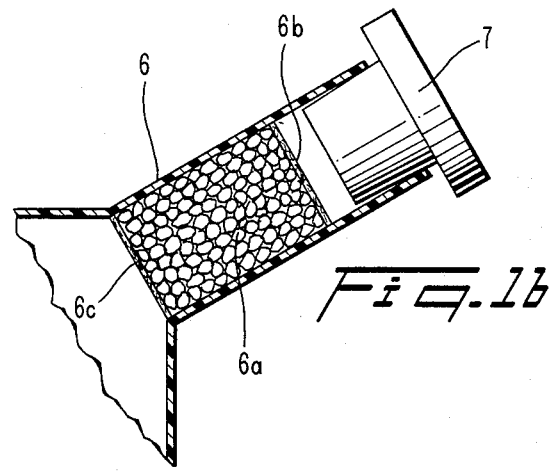
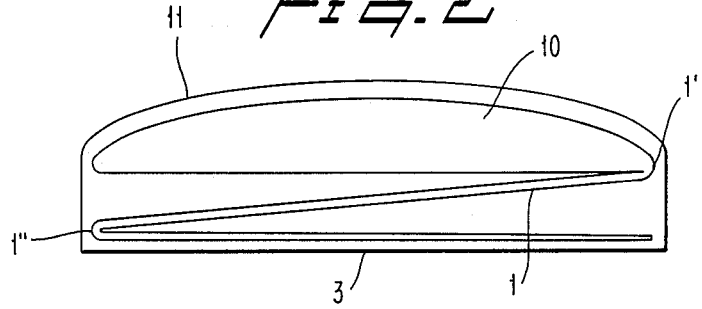

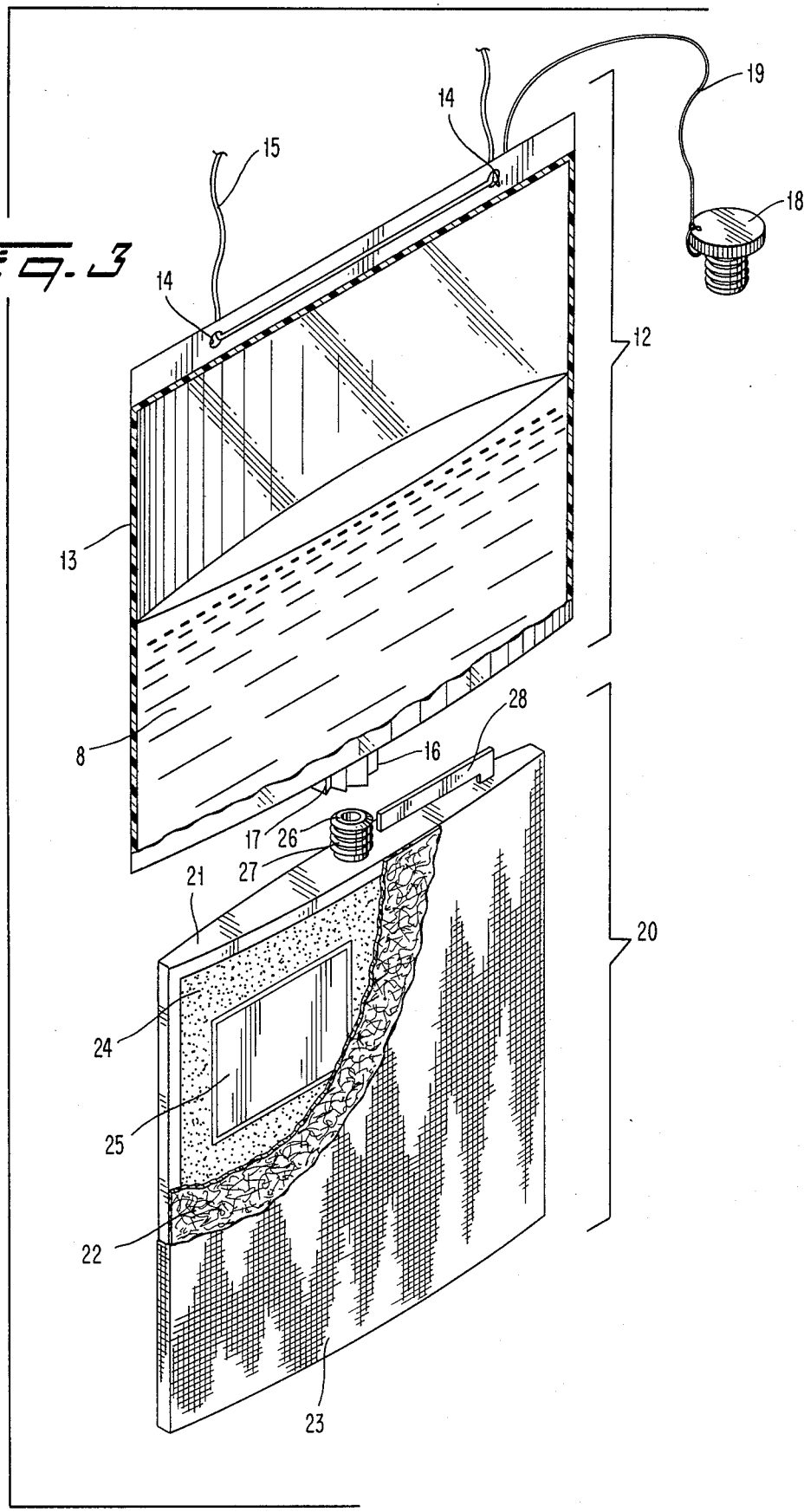

APPARATUS FOR TRANSFORMING SEA WATER, BRACKISH WATER, POLLUTED WATER OR THE LIKE INTO A NUTRIOUS DRINK BY MEANS OF OSMOSIS

CROSS-REFERENCE TO RELATED APPLICATIONS

This application is a Continuation of Application Ser. No. 873,109 filed June 10, 1986, which is a Continuation of application Ser. No. 617,182 filed June 4, 1984, which is a Continuation of Ser. No. 471,636 filed March 3, 1983, which in turn is a Continuation-in-Part of Ser. No. 298,025 filed August 31, 1981, which in turn is a Continuation-in-Part of application of Ser. No. 094,666 filed November 15, 1979, respectively, all now abandoned.

BACKGROUND OF THE INVENTION

This application relates generally to sea water desalination kits being used for naval rescue equipment or as an emergency water purifier.

The application relates also to a method for producing, by means of natural osmosis, a nutritious drink out of non-potable, water-containing liquids.

To date, there exist two different types of desalination kits being small enough to be suitable as naval rescue equipment: devices making use of chemical treatments of sea water, and inflatable distilling devices energized by the sun.

The latter devices are not foolproof, they are very delicate, and all depend on sunlight and on very slow seaway. Therefore, the chemical treatment of sea water is preferred. The disadvantage of the chemical method is the high price of the chemicals (up to several hundred dollars for desalting 1000 g of sea water).

Another disadvantage is poor taste and sometimes even harmful effects of the portable water produced by such a chemical treatment.

Another disadvantage is the high dead weight of such a chemical desalination kit, varying between 250 g and 350 g for producing 1000 g of potable water.

Hence, the weight advantage of such chemical desalination kits for the emergency rations of potable water is limited, and considering the high price of those chemical desalination kits, simple emergency rations of potable water are preferred.

The object of my invention is a method and an apparatus for producing, by means of natural osmosis, a tasty and nutritious drink from sea water or other non-potable watercontaining liquid.

Another object of my invention is to provide an apparatus of this kind which is inexpensive, foolproof, light (about 150 g for producing 1000 g of nutritious drink), and storable for considerable periods of time.

This invention does not relate to methods and/or apparatus working by means of reverse osmosis, ultrafiltration or dialysis, and it does not relate to any method and/or apparatus using membranes which are substantially permeable to salts.

The phenomenon of natural osmosis is generally known and has been used for various test and measuring instruments.

Today those instruments are generally replaced by electronic or electric instruments.

In recent years, attempts have been made for using natural osmosis for producing potable liquids out of sea water and/or other kinds of non-potable liquids.

Most of these approaches were made by military research centers trying to develop an emergency desalination kit as a component of the naval rescue equipment of air forces and navies.

Another approach using osmosis is described by William T. Hough (U.S. Pat. Nos. 3,696,931 and 3,702,820). The Hough patents disclose different types of vessels having an osmotic membrane as an enclosing part thereof. In such a vessel, a comestible solute or solution is enclosed or can be filled in. The Hough patents also disclose that "the comestible solute is a human food of any type, provided it is soluble in water", and list about 12 examples of food materials.

Recent experiments have shown that only some of those disclosed comestible solutes or solutions are suitable for preparing, by natural osmosis from fresh water or brackish water, a diluted comestible solution, but none of those listed foods is suitable for preparing such a diluted comestible solution from real sea water (which is known to contain 3.5-4% of salts). This is because the desalination of real sea water by means of natural osmosis requires a comestible solute or solution with much higher osmosis efficiency than required for the desalination of slightly salty water.

A comestible solute or solution with such a high osmotic efficiency has not yet been found, and therefore the prior-art approach is absolutely inoperable for desalination of real sea water.

The prior-art patents fail to disclose any method or arrangement how the comestible solute or solution can be stored inside the vessel for long periods of time without drying out (and thus destroying) the wet semipermeable membrane during the storage time.

GENERAL DESCRIPTION OF THE INVENTION

The preferred embodiment of the invention is a one way device, a containing containing all the necessary semipermeable membranes and comestible soluble materials, and after the first and sole utilization this container is useless and should be discarded. By the use of fructose this invention achieves the goal of providing a comestible solute which is suitable for preparing, by means of natural osmosis, a diluted comestible solution out of real seat water with a high percentage of salts as well as out of nearly all other kinds of non-potable water containing liquids. Fructose is suitable for that goal, because fructose is really soluble, whereas most other foods like powdered milk, coffee, chocolate, fruit juice, etc., are only half soluble and half emulsive or suspensive, and therefore those other foods are not osmotically efficient.

In contrast to those foods, fructose has proved to be of unusually high efficiency in osmosis.

Fructose has the nutritive value and the taste of sugar, but in contrast to sugar fructose is one of the rare foods known to have nearly no influence on the human blood sugar level. Therefore the eating of fructose (or the drinking of a fructose solution) does not produce thirst in the human body, whereas other foods like for instance sugar solutions are known to produce thirst.

It is very comprehensible that the potable liquid produced by an emergency desalination kit must in no case produce thirst. Another suitable comestible solute is glycine. Glycine is even more efficient in osmosis than fructose, but it must be noticed that great amounts of glycine can be noxious and therefore the use of glycine should be limited.

A small amount of flavoring can be added to the comestible solute.

Another object of this invention is to provide a one way desalination kit working by means of natural osmosis which is storable for long periods of time without losing efficiency. A semipermeable membrane for natural osmosis must always be kept wet, otherwise it becomes destroyed.

Dry membranes as they can be used for reverse osmosis cannot be used for natural osmosis, since natural osmosis works without pressure and therefore natural osmosis requires a moisture in the membrane for enabling the solutions on both sides of the membrane to interact across the membrane. If during the storage time of such a natural osmosis desalination kit the wet membrane touches an osmotically efficient solute or solution, said solute or solution will dry out the membrane and thus destroy it.

This invention provides two methods for preventing such a drying up of the membrane during storage periods.

One method is to use a bag type vessel having an elongated shape. The lower portion of this bag is made out of semipermeable membrane material, whereas the upper portion of said bag is made out of impermeable and dry flexible material.

The solute is stored in this impermeable and dry upper portion of the bag, and the bag is folded with at least one fold separating said dry impermeable portion of the bag from said wet semipermeable portion thereof.

This folded bag is sealed in a narrow packing bag, and the pressure of this outer packing bag keeps the separating fold(s) close and prevents the solute from coming in contact with the wet membrane during the storage period.

Before use, the outer packing bag is removed and the inner bag (which is the actual desalination kit) is unfolded and shaked. Thus the solute will fall down into the wet semipermeable portion of the bag and the desalination kit is ready for use.

Another method for preventing the wet membrane from becoming destroyed by drying out is to spread a thin layer of hygroscopic material onto the outside of the wet semipermeable membrane. Thereafter the membrane can be stored in direct contact with an osmotically efficient solute or solution.

Said osmotically efficient solute or solution touching one side of the wet membrane will suck out moisture of the membrane, but at the same time the thin layer of hygroscopic material on the other side of the membrane will also suck out some moisture of the membrane. Thus on both sides of the membrane a thin layer of moist pap will be formed and those layers of moist pap will prevent the intermediate membrane from drying out totally and becoming destroyed. During the use of the desalination kit said thin layer of moist pap on the membrane's outside will soon be washed away without any aftereffect.

Regarding the hygroscopic material for said thin layer on the membrane's outside, only such material are suitable which cannot permeate the membrane. For instance a syrupy sugar solution is suitable. A lubrication with fat or oil is suitable too.

Another object of this invention is to provide a bag type flexible vessel for osmosis, which can serve as a long-time container for saving a liquid.

For osmosis the vessel must include a semipermeable portion, but since all suitable semipermeable membranes are very fragile, such a vessel is not stable enough to serve as a longtime container for a liquid. After some hours or days the semipermeable membrane can become damaged and liquid will leak out of the vessel. This invention provides a vessel having a baglike upper portion made out of strong impermeable flexible material, and having a leakproof lower portion attachable to the upper portion and being made substantially out of semipermeable membrane.

Said semipermeable portion may contain the osmotically efficient solute, provided that the membrane's outside is provided with a hygroscopic material as disclosed above.

After osmosis has ended, the vessel is turned around and the semipermeable portion is brought onto the top of the vessel. Now all liquid will flow from the semipermeable portion into the impermeable bag type portion of the vessel. Thereafter the semipermeable portion can be removed and the remaining bag can serve as a leakproof closeable long-time liquid container.

The bag type impermeable component of this device can serve for many times, whereas the semipermeable component and the solute can only be used for one time.

Another goal achieved by this invention is to provide methods for speeding up the expiration of osmosis. A semipermeable membrane being suitable for producing by means of natural osmosis a comestible diluted solution out of real sea water must have a salt retention of approximately 95% or more.

A membrane having such a high salt-retaining capability, however, permits only a very slow rate of the water flow therethrough. It takes therefore a very long time for water to pass by osmosis through the membrane and fill up the container.

A membrane with a lower salt retention of about 85% permits a faster water throughflow, so that a larger amount of diluted comestible solution is available in the container in a shorter time. This solution recovered in the faster process contains too much salt, and therefore can no longer be considered as harmless for drinking.

The present invention makes it possible to achieve by means of a single membrane a faster water throughflow comparable to prior-art membranes having about 85% of the salt retentivity and at the same time, in spite of this faster rate, the separated water is desalinated to a high degree comparable with membranes having an about 95% salt retention.

According to the invention, the outer side of a membrane having a low salt-retaining capability, is covered over with a fabric, such as a polyester fabric with a mesh size between 0.05 and 0.5 mm. This fabric even if by itself has a zero salt-retaining capability because the mesh apertures thereof are a thousand times larger than the ions of salt, and normally all salt ions could pass through.

If this fabric is directly laid on the outer surface of the membrane, then in the course of the natural osmosis an electrical interaction between the fabric and the salt ions takes place and, as a result, the membrane suddenly acquires a substantially increased salt-retaining quality, while at the same time it permits a fast passage of water therethrough.

This discovery contradicts the test results made with reverse osmosis according to which the deposition of a tissue or fabric on the outer surface of the membrane obstructs the flow on the outer side of the active layer and thus causes the formation of the so-called salt dew, that is, the increase of salt concentration on the outer side of the active layer. This detrimental effect known from the reverse osmosis has hitherto been considered as taking place also in the case of natural osmosis. For this reason, care was taken that the outer surface of the semipermeable salt-retaining membrane be free and no fabric or any other obstacle be laid thereon.

Presently, if any fabric was used, it was applied exclusively on the inner side of the membrane, i.e. to the side remote from the salt water.

As mentioned before, the present invention is based on the discovery that, in the process of natural osmosis, a fabric on the outer surface of the membrane does not impair its function as has hitherto been assumed, but in contrast the performance of the membrane is substantially improved.

This improvement of the operation of a semipermeable salt-retaining membrane consists of at least two layers, namely of a salt-impermeable "active" layer, and of a porous, salt-permeable "support" layer underlying the active layer. This "support" layer has hitherto been used always on the rear side of the membrane adverse to the salty water. In prior-art methods it has been assumed that if this porous "support layer" is exposed to the salty solution it would become clogged and inoperative.

According to a modification of the method of this invention, in the case of natural osmosis the aforementioned advantageous effects of a higher throughflow of high-quality water through the membrane is achievable also when, in the case of natural osmosis, the membrane is used with reversed layers, i.e. with its active layer inside and with its support layer on the outside. It has been found that, in contrast to reverse osmosis, the performance of the membrane is higher when the support layer is exposed to the salt solution, and that no clogging with salt will occur.

In spite of the fact that these results contradict the theory, the combination of a natural osmosis with such a simple reversal of the order of commercially available membranes brings about substantial improvement in the salt retention and in the water throughflow of this membrane.

Another method how to speed up the expiration of osmosis is achieved by a combination of natural osmosis and ion exchange. The desalination kit working on the basis of this combination employs a semipermeable membrane having a lower salt retaining capability but a faster water throughflow. In this manner, the osmosis proceeds particularly fast but the resulting diluted comestible solution has relatively large proportion of salt. This excess salt according to a further modification of this invention, is bound by means of ion exchangers. The ion exchangers are admixed to the comestible solute and are filtered out therefrom immediately before the solute is consumed. Preferably, a suitable filter is arranged in the mouthpiece of the container.

The advantages of this method reside in the fact that the diluted comestible solution is produced faster than in the case when natural osmosis alone is used. This method requires substantially less ion exchanging material than in the case where sea water is desalinated by ion exchangers only without the assistance of osmosis.

In addition, this combined method enhances the elimination of bacteria and other polluting substances from the sea water. When using ion exchangers alone, it is only salt which is separated, but the other pollutants remain in the water.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of the desalination apparatus of this invention in its unfolded condition;

FIG. 1a is a perspective view of a cut away lower part of the bag of FIG 1;

FIG. 1b is a sectional side view of the efflux tube in the bag of FIG. 1;

FIG. 2 is a side view of the apparatus of FIG. 1 in its folded and packed condition;

FIG. 3 is a perspective view of another embodiment of a two-piece desalination apparatus of this invention;

DESCRIPTION OF THE PREFERRED EMBODIMENTS

Figure 4:
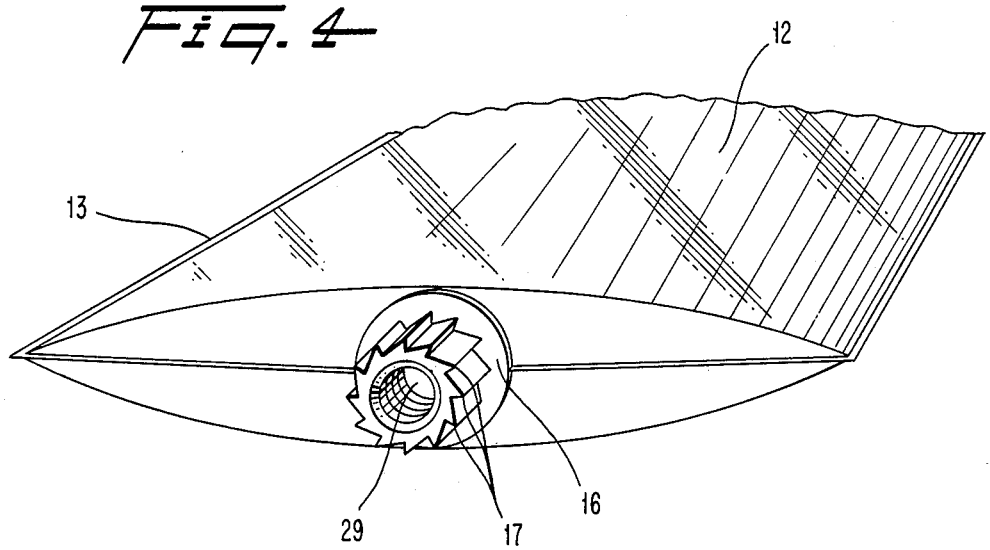
FIG. 4 is a perspective view of a cut away portion of the lower part of the apparatus of FIG. 3.

FIG. 1 illustrates an elongated, hollow tubular bag 1. The upper part 2 of the bag is made from an impermeable flexible material, whereas the lower part 3 of the bag is made of a flexible semipermeable osmotic membrane 4 manufactured of any suitable substance well known in the art.

The upper end of the bag 1 is formed with an eyelet 5 which allows the bag to be suspended by means of a cord or cable 5a or the like. The top of the bag 1 is also formed into an efflux tube 6 which allows purified water entering the inside of the bag 1 to be emptied. The efflux tube 6 is also equipped with a closure plug 7.

When the bag 1 is suspended at eyelet 5 so that the semipermeable membrane is completely submersed in sea water, the purified water will diffuse by osmosis through the membrane material and enter the inside of the bag 1. In FIG. 1, about one half of the bag is filled with purified water.

As will be seen from FIG. 1a, the membrane 4 is seamed in a window-like opening in the waterproof of the remaining part of bag 1 and is covered by a water-permeable fabric 9 made of a polyester material, for example. This fabric 9 may cover the entire surface of bag 1 or the surface of membrane 4 only. Preferably, the fabric 9 with a mesh size between 0.05 and 0.5 mm is in the form of a tube or envelope snugly enclosing the desalination bag 1.

FIG. 1b shows the efflux tube 6 provided with filters 6b and 6c enclosing therebetween granules 6a of an ion exchanging material.

FIG. 2 shows the bag 1 in its folded condition and packed in a protective sheath. The active lower part 3 of the bag, containing the semipermeable osmotic membrane, is bent along bends 1' and 1" in three folds, of which the upper fold of the bag contains a nutritious solute which, as mentioned before, is made preferably of fructose or glycine. The protective envelope or sheath 11 encloses the folds so tightly that the nutritious material cannot spill over the bends into the semipermeable membrane portion. Only when the packing sheath 11 is teared off and the desalination bag 1 is unfolded, does the nutritious solute 11 automatically fall by the force of gravity into the lower bag portion 3.

FIG. 3 illustrates a modified version of the desalination bag of this invention which consists of two connectable parts 12 and 20. The upper part 12, which is made of a flexible, non-permeable material such as a synthetic film joined together along seams 13, may be used as many times as desired. The upper rim of the part 12 is provided with two eyelets 14 for receiving a suspension cable 15. The bottom of the upper part 12 is formed with a tubular connection piece 16 formed with inner thread and having on its outer periphery teeth-like recesses 17. The connection tube 16 is closable by a threaded closure lock 18 suspended to an eyelet 14 by a cord 19. The upper bag portion 12 contains a comestible solution 8.

The lower part 20 is in the form of a flat, corsetlike container which is substantially smaller in size than the upper flexible bag part 12.

The lower corset 20 includes a frame 21 of a suitable plastic material which is covered at both open sides thereof with semipermeable membranes 22. Similarly as in the preceding example, the membrane 22 is coated with a cloth or fabric 23 which is permeable to water. The outer fabric 23 is preferably in the form of a tube which snugly fits the frame 21. The corset 20 contains a pulverized fructose 24. In addition, the corset may include one or more smaller containers 25 of a porous material, such as paper. The additional containers are filled with ion exchangers or with flavoring agents. Before use of the desalination apparatus and during the storage period, the contents of the additional containers are separated from fructose and only when sufficient amount of water enters the interior of cassette 20, the contends of container 25 mixed with fructose. The upper end of the frame 21 is formed with a connection piece 26 provided with an outer thread 27 fitting the thread of connection piece 16 in the upper part so that the two parts are hermetically linked to one another. The upper end of frame 21 also supports a pawl or stop latch 28 which engages the serration 17, thus preventing unintentional unscrewing of the upper part from the lower one.

FIG. 4 shows in a perspective detailed view the configuration of the flexible upper part of the desalination apparatus and the shape of the connection piece 16.

Figure 5:
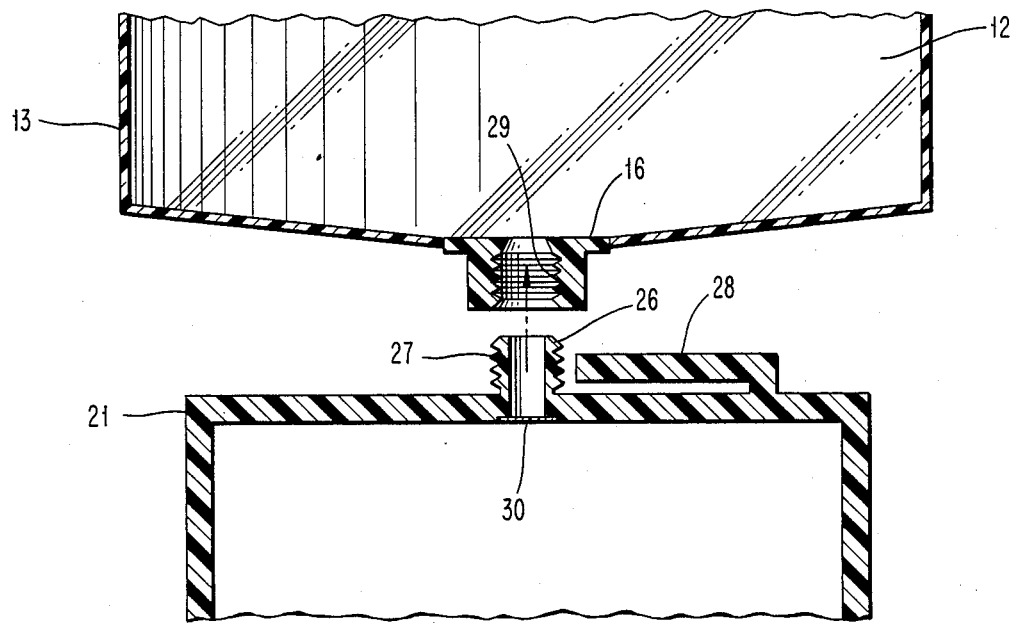
FIG. 5 is a schematic, sectional side view of a part of the apparatus of FIG. 3.

FIG. 5 illustrates in a cross section the threaded connection 27 and 29 and a filter 30 provided in the connection piece 26 of the cassette frame 21. The filter serves for separating ion exchanging particles from the purified water entering the upper bag 12.

It is necessary that the contents of fructose 10 in the bag be such that at least 90% concentration of fructose is available for starting the osmotic desalination of sea water. If the fructose inside the bag has a concentration less than 90% the osmotic desalination of water, even if it still takes place, rapidly loses its effect. If the concentration of fructose is decreased to about 74%, then the passage of water may even be reversed, that is, no purified water passes from the sea water in the bag but instead pure water from the fructose solution flows through the membrane into the sea water, and the desalination apparatus would lose water and the concentration of fructose would increase. This case may occur for example when fruit juices having on the average 1–4% of fructose, or a table sugar solution, is substituted for pure fructose.

It will be understood that each of the elements described above, or two or more together, may also find a useful application in other types of constructions differing from the types described above.

While the invention has been illustrated and described as embodied in specific examples of the desalination device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A housing forming an interior chamber and comprising:
   a semipermeable membrane portion communicating with said chamber and having an outer membrane surface,
   a flexible porous layer of salt permeable material covering at least said outer membrane surface of said membrane portion, said membrane portion retaining salt while allowing purified water to pass therethrough into said chamber by regular osmosis, and
   at least one efflux tube communicating with said chamber and through which purified water may pass from said chamber.

2. A housing according to claim 1, wherein said flexible porous layer completely encloses the outer surface of the housing.

3. A housing according to claim 1, further comprising a comestible solute or solution provided in said chamber and consisting substantially of pure fructose.

4. A housing according to claim 1, further comprising an osmotically effective solute or solution provided in said housing, an ion exchange material provided in said housing and means for filtering said ion exchange material from liquid being discharged from said housing.

5. A housing according to claim 4, wherein said ion exchange materials and said filtering means are provided in said efflux tube.

6. A housing according to claim 1 wherein said flexible porous layer is folded into sections and can be unfolded.

7. A desalination apparatus comprising:
   a housing formed of a flexible bag and including a semipermeable portion composed of a semipermeable membrane material permeable to water and substantially impermeable to salt and an impermeable portion,
   a comestible osmotically effective solute or solution provided within said impermeable portion, said semipermeable portion being empty before initiation of an osmotic process, said flexible bag being folded in at least one bend separating said impermeable portion from said semipermeable portion to form means for separating said solute or solution from said semipermeable membrane material before initiation of an osmotic process, said flexible bag being unfoldable to enable said solute or solution to contact said semipermeable membrane material during the osmotic process, and a packing bag in which said flexible folded bag is packed, said packing bag pressing said at least one bend of said flexible bag to prevent leakage of said comestible solute or solution into said semipermeable portion.

8. A housing comprising first and second parts, and connecting means to connect said first and second parts together, said connecting means allowing liquid to flow from one of said parts into the other of said parts, said first part being composed of a nonpermeable flexible material and said second part including a semipermeable membrane material permeable to water but substantially impermeable to salt, said second part being removable from said first part after liquid has been transferred from said second part to said first part.

9. A housing according to claim 8, wherein said connecting means includes a threaded connection piece.

10. A housing according to claim 8, wherein said second part contains a comestible, osmotically effective solute or solution.

* * * * *